United States Patent [19]

Hayles

[11] Patent Number: 4,506,964
[45] Date of Patent: Mar. 26, 1985

[54] LENS ATTACHMENT FOR MULTIPLE IMAGING AND VIGNETTING

[76] Inventor: David C. Hayles, 11403 Sagestanley, Houston, Tex. 77089

[21] Appl. No.: 361,000

[22] Filed: Mar. 23, 1982

Related U.S. Application Data

[63] Continuation-in-part of Ser. No. 302,291, Sep. 3, 1981, Pat. No. 4,423,939.

[51] Int. Cl.³ .................................................. G03B 41/00
[52] U.S. Cl. ...................................... 354/122; 354/296
[58] Field of Search ................................ 354/122, 296

[56] References Cited

U.S. PATENT DOCUMENTS

| | | | |
|---|---|---|---|
| 678,490 | 7/1901 | Hug | 354/122 |
| 1,533,433 | 4/1925 | Linden | 354/122 |
| 2,186,610 | 1/1940 | Leavitt et al. | 354/122 |
| 2,193,333 | 3/1940 | Heward | 354/296 |
| 3,940,775 | 2/1976 | Bodnar | 354/122 |
| 4,012,748 | 3/1977 | Lemanski | 354/122 |
| 4,079,394 | 3/1978 | Roncone | 354/122 |
| 4,122,470 | 10/1978 | Loranger et al. | 354/122 |

*Primary Examiner*—John Gonzales
*Attorney, Agent, or Firm*—Arnold, White & Durkee

[57] ABSTRACT

A multiple imaging attachment 26 is provided to be utilized with a camera 10 to achieve desired multiple imaging and vignetting effects. The multiple imaging attachment 26 includes a housing 54 having an opening 60 formed therein. Light is transmitted through the opening 60 to a lens 12 to expose the camera film frame. A mask 64 is provided which transmits light to selected portions of the camera film frame. The mask 64 is movable in tracks 70 along a predetermined diagonal path in the housing 54 to permit exposure of second selected portions of the camera film frame. The mask 64 can then be rotated by a coupler housing 30 to permit light to be transmitted to expose third selected portions of the film frame.

13 Claims, 31 Drawing Figures

LENS ATTACHMENT FOR MULTIPLE IMAGING AND VIGNETTING

This is a continuation in part of my application Ser. No. 302,291 filed Sept. 3, 1981, now U.S. Pat. No. 4,423,939, and entitled Lens Attachment and Method For Multiple Imaging.

TECHNICAL FIELD

This invention relates to a multiple imaging camera lens attachment and more particularly to a lens attachment for multiple imaging and vignetting.

Multiple imaging has been a popular photographic technique over the years. One reason for this popularity is because it contributes to the conservation of film. When multiple imaging it is often desirable to maximize the number of pictures on a single film. Additionally it can also be desirable to highlight the individual pictures by having the outer periphery of the picture characterized by a distinct image or border. One such example would be a picture having its outer periphery highlighted by a circle. That is a picture taken within a circle. This camera technique is known as vignetting. Use of the Vignette technique enables creative multiple vignette effects to be made on a single negative by preventing light from reaching all but a selected well defined area on the negative.

Multiple imaging and vignetting is desirable while maximizing the number of pictures to be taken. It is often difficult to maximize the number of pictures to be taken during the multiple imaging and vignetting process because of the limitations of the existing lens opening structures formed therein resulting in an inability to isolate portions of the film. This difficulty exists because the structures will not allow ready movement of the mask to reach all areas of film.

BACKGROUND ART

Attempts have been made to provide lens attachment structures that will facilitate multiple imaging and vignetting effects. One typical arrangement is illustrated in U.S. Pat. 4,124,859. This arrangement discloses a structure having a first portion coupled to the lens which can be moved radially to isolate selected portions of the film. This portion of course facilitates the multiple imaging. A second portion of the structure is removably attachable to the first portion. By selectively changing the second portion the vignette effects are achieved.

Although this device provides multiple imaging and vignetting effects because of the structure involved only a predetermined number of portions of the film can be isolated.

There is no provision for isolating all areas of the film and thereby maximizing the number of pictures taken.

DISCLOSURE OF THE INVENTION

The invention relates to a multiple imaging and vignetting attachment. The attachment in accordance with the present invention includes a housing having configuration for allowing light to be transmitted longitudinally through the housing. This facilitates exposure of the film frame. A masking means is provided having an opening formed therein. This means masks the opening in the housing as well as transmits light to first selected portions of the film frame. A means is provided for moving the masking and light transmitting means along a predetermined diagonal path across the film frame. As a result light can be transmitted to expose second selected portions of the film frame. Still further the invention includes a means for rotating the masking and light transmitting means so that light can be transmitted to expose third selected portions of the film frame.

BRIEF DESCRIPTION OF THE DRAWING

The details of the invention will be described in connection with the accompanying drawing in which.

BEST MODE FOR CARRYING OUT THE INVENTION

Figure 1:
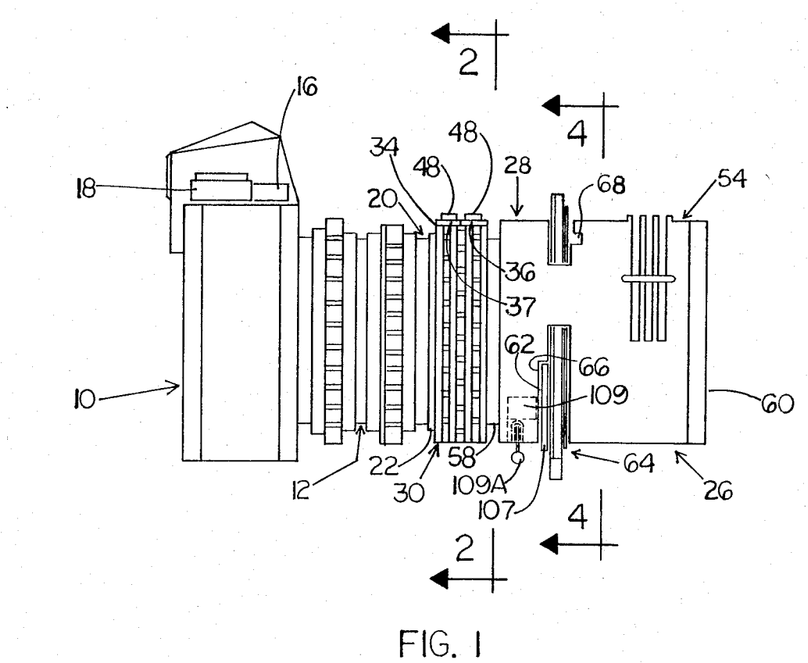
FIG. 1 is a side view of a camera having a multiple imaging attachment illustrating the preferred embodiment of the invention.
Figure 6:
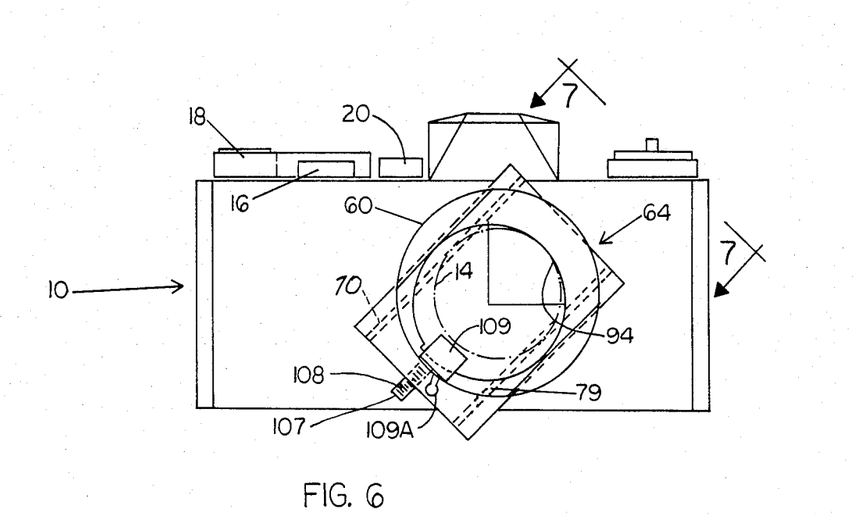
FIG. 6 is an enlarged view taken along lines 6—6 of FIG. 1.

Referring to FIG. 1 there is shown a camera 10, such as for example a 35 mm camera, having a forwardly projecting cylindrical lens housing 12, which supports a lens 14 (FIG. 6). The camera 10 includes a control switch 16 for activating or deactivating the camera and film control lever 18. The film control lever 18 is rotatable in a counterclockwise direction to prevent a film frame previously exposed in the camera 10 from being advanced when the film control level 18 is activated to reset the exposure mechanism of the camera. By repeating this process a user may take more than one exposure on a single film frame.

A plurality of inner threads (not shown) is provided at the end of the lens housing 12 nearest the lens 14 to allow a lens housing extention 20 having a corresponding threaded end (not shown) to be threadedly coupled to the lens housing 12. The lens housing extention 20 includes a pair of spaced raised abutments 22 (only one shown) formed thereon which results in a channel 24 (FIG. 2) being formed there between.

Figures 2, 3:
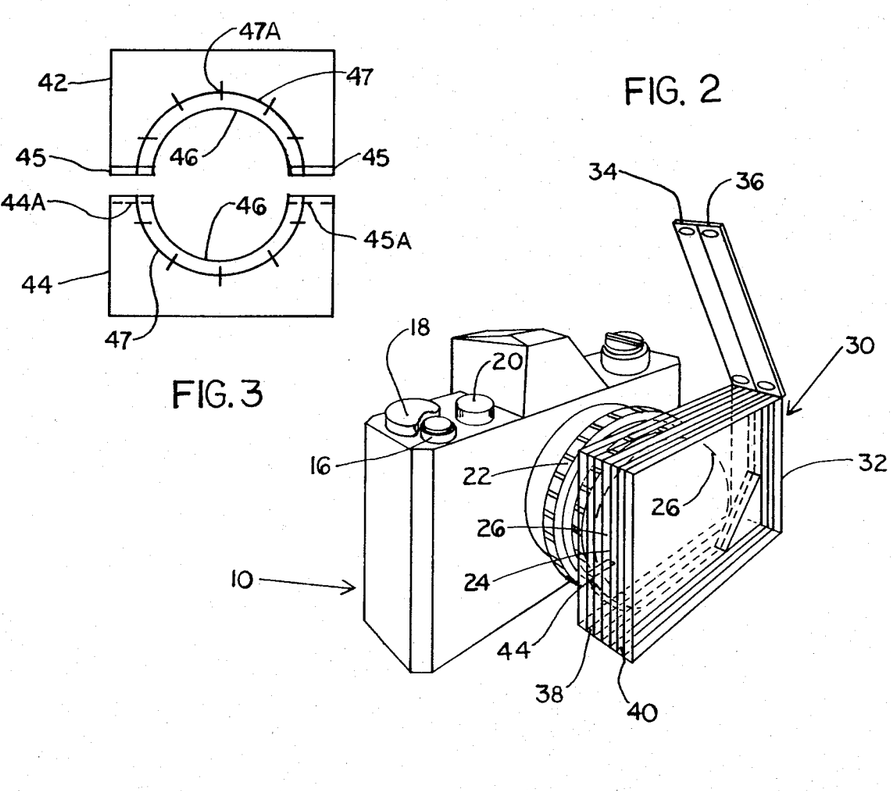
FIG. 2 is an enlarged view taken along lines 2—2 of FIG. 1.
FIG. 3 is a view illustrating the locking members forming a part of the preferred embodiment of the invention.

A multiple imaging attachment 26 is provided to be used in conjunction with the camera 10. The multiple imaging attachment 26 includes a housing 28. The housing 28 includes a coupler housing 30 to secure the multiple imaging attachment 26 to the camera 10. As illustrated in FIG. 2 the coupler housing 30 is a hollow rectangular shaped member formed of a base 32 and a pair of covers 34 and 36. Formed in the sides and bottom of the base 32 are a pair of spaced grooves 38 and 40. The grooves 38 and 40 each receive and hold a pair of rectangular shaped locking members 42 and 44 (FIG. 3). The locking members 42 and 44 help to secure the coupler housing 30 to the lens housing extention 20.

The locking member 42 is formed with portion 45 which fits in recesses 45a in the locking member 44 to interlock the two locking members. The locking members 42 and 44 are formed with semicircular recessed portions 46 which fit in the upper and lower portions respectively of the channel 24. To secure the coupler housing 30 to the lens housing extention 20 the locking member 42 is slid in the lower part of the groove 38 in the base 32 and held adjacent to the lens housing extension in the channel 24. The locking member 44 is then slid into the upper part of the groove 38 so that the recessed portion 46 of the locking member is adjacent to the lens housing extension 20 in the channel 24. The cover 34 is then secured to the base 32 by couplers 48 to lock the coupler housing 30 to the lens housing extension 20. The recessed portions 46 of the locking members 42 and 44 cooperate with the channel 24 to secure the coupler housing 30 for rotation about the lens housing extension 20.

An abutment 47, including marking indicia 47a, is formed on the locking members 42 and 44 so that the abutment is above the abutments 22 when the locking members are in place in the coupler housing 30. This assists the user in rotating the coupler housing to desired positions.

Referring again to FIG. 1 the housing 28 of the multiple imaging attachment 26 includes a hollow cylindrical shaped support housing 54 including integrally formed front and end sections 56 and 58 having a hollow opening 60 extending therethrough. The front section 56 and end section 58 of the support housing 54 are formed so that the opening 60 is larger in the front section than in the end section. The end section 58 of the support housing 54 is attached to the coupler housing 30 with a pair of locking members 42 and 44 held in the groove 40 of the base 32 of the coupler housing. The recessed portions 46 of the locking members 42 and 44 are held in the groove 40 to engage the surface of the end section 58 of the housing 54 by cover 36 and coupler 48 of the coupler housing 30. Thus the housing 54 is locked to the coupler housing 30 so that the opening 60 formed therein is directly aligned with the lens 14 thereby providing a longitudinal light path through the opening to the lens.

The support housing 54 of the multiple imaging attachment 26 also includes a slot 62 formed therein for allowing a mask or light blocking member 64 to be inserted into the opening 60 of the support housing. The slot 62 has recesses 66 and 68 formed therein to accomodate the shape of the mask 64 and guarantee unobstructed movement of the mask in the support housing 54.

The mask 64 is held in alignment with the lens 14 in the opening 60 in the support housing 54. The mask 64 is held in the support housing 54 to move along a diagonal path which is defined by a pair of spaced raised abutments or tracks 70 formed in the support housing 54 to extend along the outer periphery of the lens 14 at a forty-five degree (45°) angle.

Figure 4:
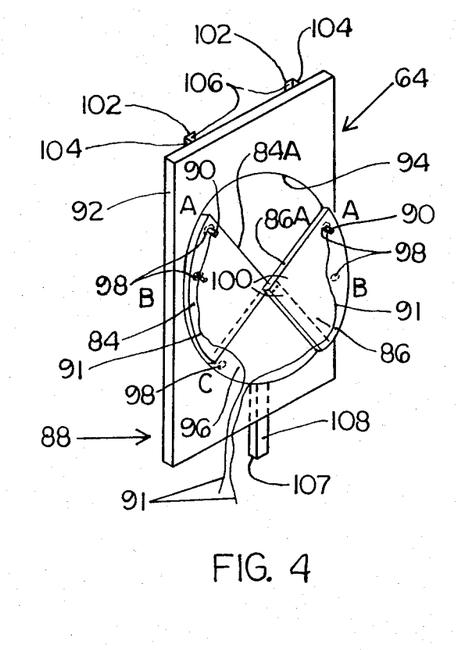
FIG. 4 is a prospective view of an inner mask member forming a part of the multiple imaging and vignetting attachment.

As illustrated in FIG. 4 the mask 64 is formed of three masking sections 84, 86 and 88. Masking sections 84 and 86 of the mask 64 are each shaped to cover at least an area equal to approximately one fourth of the lens 14 of the camera 10. The masking sections 84 and 86 each have a spring biased pin 90 extending therethrough. The masking section 88 of the mask 64 is formed of a substaintially rectangular support member 92 having an opening. When the mask 64 is aligned and held in the slot 62 selected portions of the opening 94 will permit light to be transmitted from the opening 60 in the support 54 to the lens 14 to expose selected portions of film. The section 96 of the masking section 88 is substantially the same shape and size as the masking section 84 and 86 of the mask 64.

The support member 92 of the masking section 88 includes a plurality of spaced apetures 98 formed about the periphery thereof. The masking section 84 and 86 are aligned adjacent to support member 92 of the masking section 88 to permit portions of the outer extremities of each section to slightly overlap the section 96 and support member. This results in portions of the opening 94 always being uncovered for the transmission of light therethrough. Additionally the masking section 84 and 86 are aligned adjacent to the support member 92 so that the spring biased pins 90 can always rest in an adjacent corresponding aperture 98 in the support member. The masking sections 84 and 86 are coupled to the section 96 of the masking section 88 and mounted thereto for rotation by spring biased fasteners 100. The spring biased fasteners 100 exert a force on the sections 84 and 86 that tends to push them toward the respective A positions. With this arrangement the sections 84 and 86 can be pivoted upon releasing the pins 90 by pulling strings 91 so that either one fourth, one third or one half of the opening 94 is uncovered. This will allow the transmission of light to different size portions of the lens 14 when the mask 64 is aligned in the opening 60 thereby allowing different numbers of pictures to be taken on a single film.

In order to provide a mask 64 with only one fourth of lens 14 covered the portions 84a and 86a of masking sections 84 and 86 respectively must be held by the spring biased pins 90 at corresponding positions A as is illustrated in FIG. 4. This will provide light to expose only one fourth of a film at a time thus allowing multiple imaging with four exposures to each film frame. In order to enlarge the opening so that only one third of the lens 14 is covered and three exposures per film frame taken the portions 84a and 86a of the masking sections 84 and 86 respectively must be rotated to corresponding positions B illustrated in FIG. 4. Similarly if only one half of the lens is to be covered to allow two exposures per film frame the portions 86a of the masking section 86 must be held in position A and the portion 84a of the masking section 84 held in position C. When the mask 64 is set to achieve the desired number of exposure different portions of a film frame can be exposed by resetting the film as previously described and rotating the coupler housing 34 after each exposure so that light is transmitted to a different portion of the lens 14.

Figure 5:
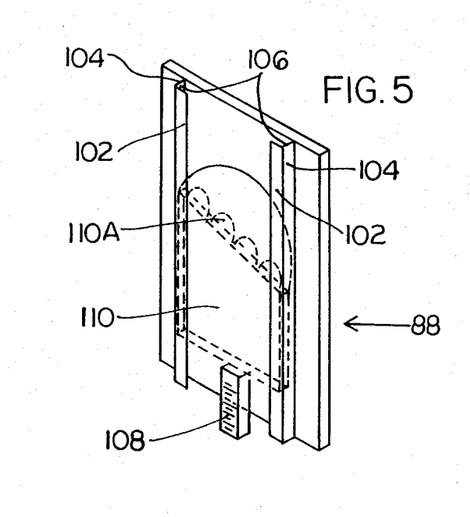
FIGS. 5 and 5A are rear views of the mask illustrated in FIG. 4.
Figure 5A:
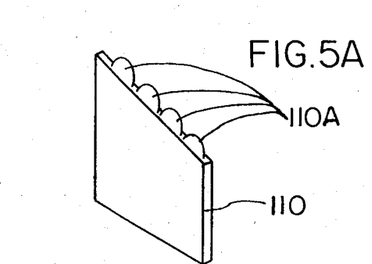
Figure 7:
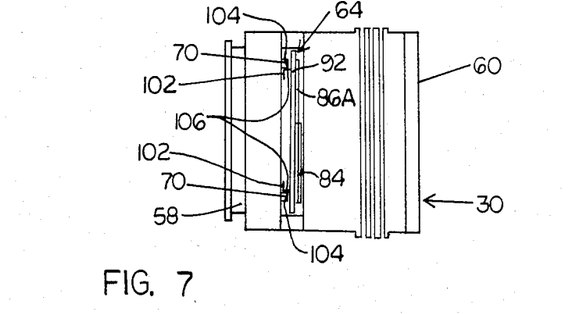
FIG. 7 is an enlarged view taken along lines 7—7 of FIG. 6.

The mask 64 also includes a plurality of spaced aligned tracks 102 which are formed vertically along the back of the rectangular support 92 of the masking section 88 (FIG. 5). The tracks 102 are formed with outer walls 104 and inside tracking slots 106. The tracks 102 are spaced a sufficient distance apart on the back of the support member 92 to allow the outer walls 104 thereof to engage the abutments 70 when the mask 64 is in the support housing 54 (FIG. 7). This secures the mask 64 in the housing 54 and allows the mask to be moved along the path defined by the abutments 70. That is the outer walls 104 of the tracks 102 cooperate with the abutments 70 formed in the support housing 54 to enable the mask 64 to be held in the housing 54 and slidably moved therein across the lens 14 along the path defined by the abutments 70.

A handle 107 having a gearing track 108 formed therein is formed on a front lower part of the rectangular support 92 of the masking section 88. A gear box 109 is mounted in the support housing 54 so that a gear (not shown) extends out of the gear box to engage the gearing track 108. A handle 109a forming a part of the gear box 109 and cooperating with the gears therein in a known manner can be moved laterally to cause the gear that engages the gearing track 108 to force the mask 64 to be moved up or down along the path defined by the abutments 70.

Referring to FIG. 6 the mask 64 is mounted for slidable movement in the support housing 54 along the path defined by the abutments 70 to allow for movement of the mask diagonally across the lens 14.

Because the mask 64 can be rotated about the lens as well as slide across the lens the mask can be readily moved to isolate any desired sections of the film as will be explained.

The tracks 102 of the mask 64 are also designed to recieve and support a masking members 110 (FIG. 5) on the mask 64. The masking member 110 is designed with outwardly extending circular members 110a which facilitates the vignetting effect. The masking member 110 is designed so that it can be held securely between the tracking slots 106 of the tracks 102. The masking member 110 cooperates with the mask 64 to provide multiple imaging and vignetting effects as will be explained.

Figures 8, 9:
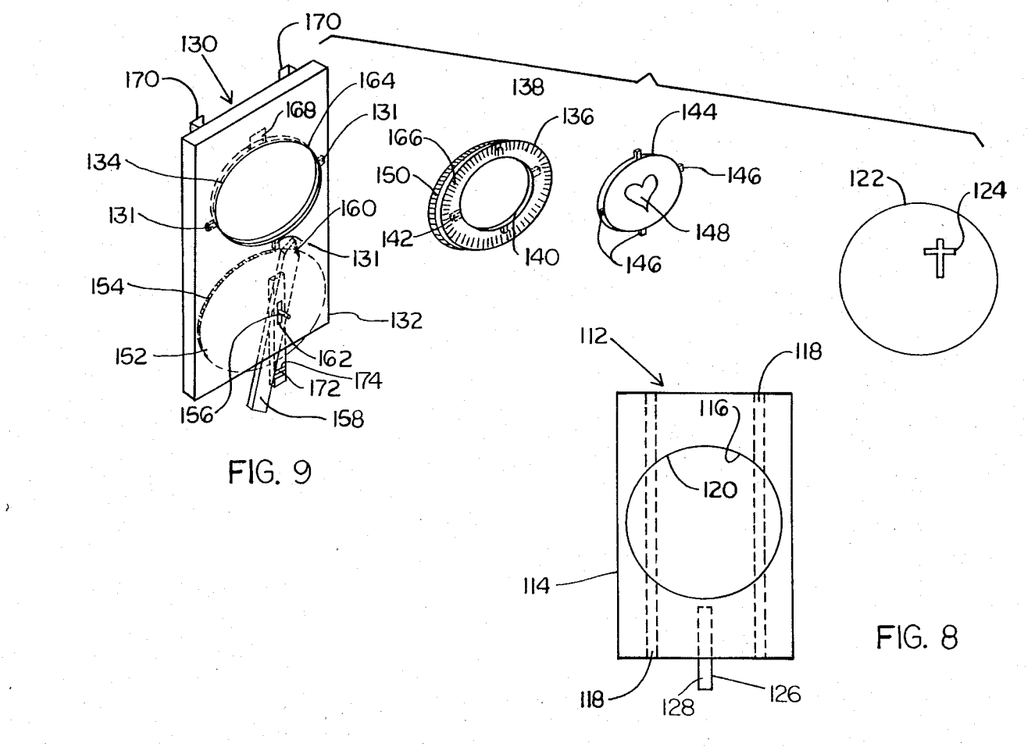
FIG. 8 is a view of a second embodiment of an inner mask member forming a part of the multiple imaging attachment.
FIG. 9 is a prospective view of a third embodiment of an inner mask member forming a part of the multiple imaging attachment.

A second mask 112 is illustrated in FIG. 8. The mask 112 is formed of a substaintially rectangular support member 114. The rectangular support member 114 has formed therethrough an opening 116. When the mask 112 is aligned and held for slidable movement in the slot 62 of the housing 54, selected portions of the opening 116 will permit light to be transmitted from opening 60 in the support housing to expose selected portions of the film frame. The mask 112 also includes on a pair of tracks 118 which can receive a masking member (not shown) when warranted. The mask 112 also includes a circular track 120 formed about the opening 116. The track 120 is designed to receive and hold a removable masking member 122. The masking member 122 is formed with an opening 124. The opening 124 may be the configuration that is desired for vinetting for example a cross. The masking member 112 also includes a handle 126 having gearing tracks 128 formed therein. This facilitates movement of the masking member 112 in the housing. The masking member 122 when aligned in the track 120 cooperates with the mask 112 to facilitate multiple imaging and provide a vignetting effect. A third mask 130 is illustrated in FIG. 9. The mask 130 is also a replacement for mask 64. The mask 130 is formed of a rectangular support member 132 having a opening 134 formed therein. The mask 130 has a plurality of pins 131 which extend into and around the opening. A supporting disc member 136 is provided to be mounted for rotation in the opening 134. The disc member 136 includes a V-shaped groove 138 which is dimensioned to permit the disc member 136 to be mounted for rotation in the opening 134. The disc member 136 includes an opening 140 formed therein. The disc member 136 also includes notched grooves 142 formed therein in the vicinity of the opening 140. A removable circular masking member 144 is provided having abutments 146 formed about its periphery.

The abutments 146 fit securely in the nothced grooves 142 of the disc member 136 to hold the masking member 144 in the disc member. The masking member 144 also includes an opening 148 formed therein.

The opening 148 may be one of a number of configurations, for example a heart, depending on the multiple imaging and vignetting effect desired.

The disc member 136 also has a plurality of notches 150 which are formed about its periphery for reasons that will be explained.

The disc 152 having teeth or gears 154 formed thereon is mounted for rotation on the support member 132 by a pin 156. The disc 152 is aligned below and adjacent to the disc member 136 so that the teeth 154 will engage the notches 150 in the disc member 136. As a result manual rotation of the disc 152 causes the disc member 136 to rotate independently of the mask 130 and housing 54.

An elongated member 158 having a beveled end 160 is mounted for pivotable movement by the pin 156 adjacent to the disc member 136.

The pin 156 is a slot 162 in the elongated member 158 and extends through the disc 152 into the support member 132.

The beveled end 160 of the elongated member 158 engages the notches 150 in the disc member 136 to allow the elongated member to rotate the disc member 136. Because of the slot 162 in the elongated member 158 the elongated member can be moved to rotate the disc 136 in the forward or backward direction as an alternative to disc 152. The disc 152 also includes a plurality of spaced marking indicia 166 which are on the side of the disc facing the lens 14. A window 168 is also provided on the side of the rectangular support 132 facing the lens 14. The indicia 166 appears in the window 168 to assure that the disc 132 is always aligned properly.

A pair of tracks 170 are formed in the rectangular support 132 to hold additional masking members when appropriate. The mask 130 also includes a handle 172 having gearing tracks 174 which facilitates movement of the mask in the housing.

Figures 10A, 10B, 10C, 10D, 10E, 10F:
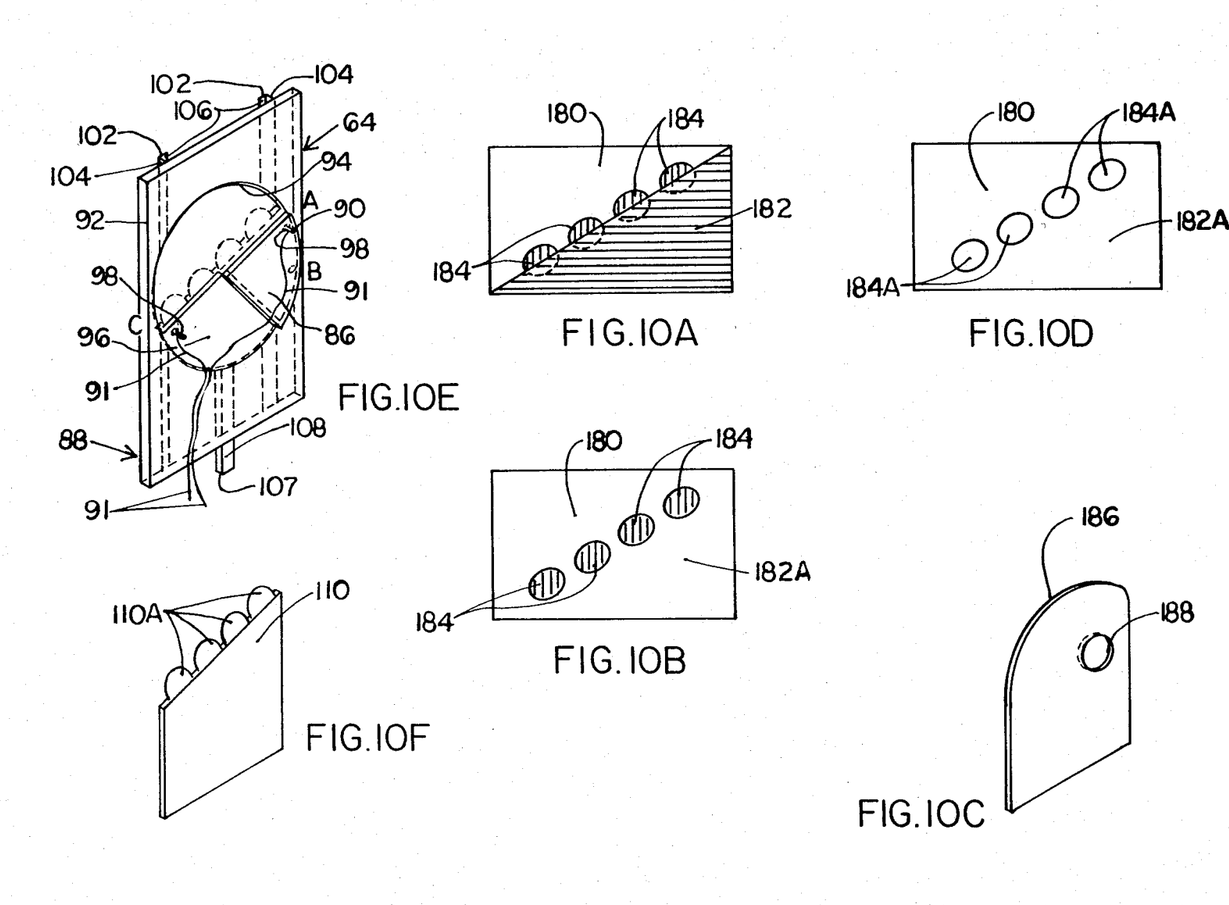
FIGS. 10A–10F are views of the first embodiment of the mask illustrating a multiple imaging configuration and showing the different areas of exposure of the film frame.
Figure 11A:
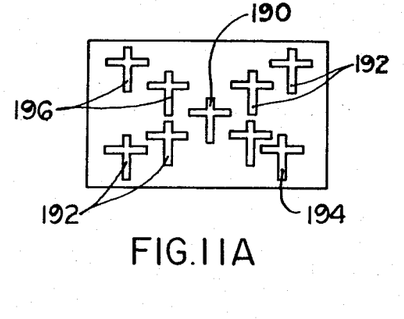
FIGS. 11A–11F are views of the second embodiment of the mask illustrating a multiple imaging configuration and showing the different areas of exposure of the film frame.
Figure 11B:
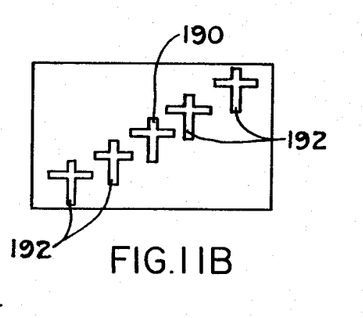
Figure 11C:
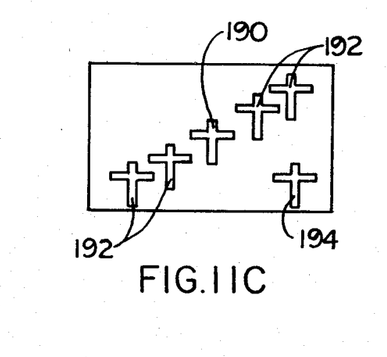
Figure 11D:
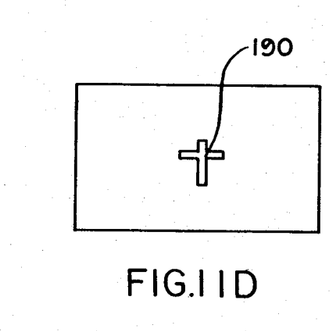
Figure 11E:
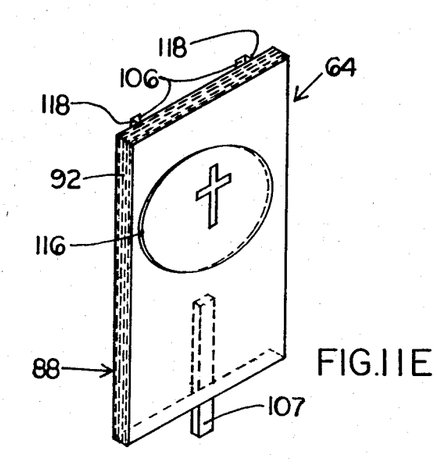
Figure 11F:
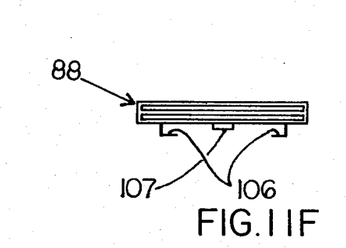

Referring to FIG. 10 the mask 64 is illustrated accomplishing a desired multiple imaging and vignetting effect. The mask 64 of course is first inserted in housing 54 (not shown) and adjusted to cover one half of the opening 60 as is illustrated in FIG. 10. A second masking member 110 is then inserted in the tracks 102 on the mask 64 so that the circular members 110a project into the uncovered portion of opening 94. At this point a picture is taken and as a result a portion of the film is exposed. As illustrated in FIG. 10a this results in portion 180 of the film being exposed and portions 182 and 184 being unexposed. After re-setting the film to position the same film frame for exposure the mask 64 is then rotated by rotating the housing 54 so that the previously unexposed portion 182 of the film frame is now uncovered. This portion of the film is exposed resulting in an exposed area 182a. Thus all of the film frame is exposed except areas 184 represented by the circles as is illustrated in FIG. 10B. As is illustrated by positioning the mask 110 as described and by rotating the mask 64 the semicircularly members 110A of the mask 110 have generated the four unexposed circular areas 184.

The circular areas 184 can then be exposed by utilizing another mask 186 having an opening 188 formed therein (FIG. 10C). The opening 188 has the same diameter as the unexposed areas 184. The mask 64 is moved downwardly in the track 70 to assure that the areas 184 are uncovered as shown in FIG. 10B. The mask 186 is inserted into the tracks 102 of the mask 64 in place of the mask 110. The mask 186 is selectively positioned in the mask 64 so that the opening 188 is selectively aligned to direct light to the unexposed areas 184. This results in a completely exposed film frame having exposed areas 180, 182a and 184a (FIG. 10D). As can be seen a vignetting effect is accomplished as represented by the exposed areas 184a. With this arrangement the user has readily isolated six different areas of the film frame which can be used to show 6 different scenes.

Referring to FIG. 11 the second mask embodiment 112 is illustrated accomplishing another multiple imaging and vignetting effect. In this embodiment the mask 112 is inserted into the tracks 70 of the housing 54. The mask 112 is provided with a circular masking member 122 which is held in the mask 112 in the track 118. The opening 124 in the masking member 122 is configured as a cross to give the desired vignetting effect. The mask 112 is moved diagonally in the track 70 to position the opening 124 to expose a desired portion of the film such as for example area 190 at the center of the film (FIG. 11A). This process of moving the mask along this diagonal path is repeated until the desired areas have been exposed, such as, for example, as is illustrated by the areas 192. (FIG. 11B). The mask 64 can then be rotated by rotating the housing 54 to place the mask 112 on another diagonal path and expose another area of the film such as, for example, area 194 as illustrated in FIG. 11C. The circular masking member 122 may have to be repositioned to guarantee that the cross is in the desired upright position after the mask 112 is rotated. The process of moving the mask 112 along this diagonal path can be repeated until desired areas have been exposed, such as, for example, as illustrated by the areas 196. By rotating the mask 112 and moving it along a desired diagonal path the maximum possible exposures can be achieved thus allowing the maximum number of different scenes on the film frame.

Referring to FIG. 12 the third mask embodiment 130 is illustrated accomplishing another multiple imaging and vignetting effect. The mask 130 is shown having masking member 198 locked in the opening 140 of the mask. The masking member 198 is formed with an open area 199, a semi-circular mask member 200 and a plurality of circular mask 202 (FIG. 12A). The mask 130 is held for slidable movement in the housing 54 in the tracks 70 in alignment with the lens 14 (FIG. 6).

Figures 12A, 12F:
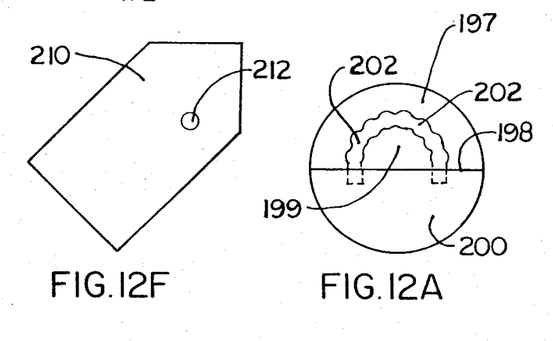
FIGS. 12A–12F are views of the third embodiment of the mask illustrating a multiple imaging configuration and showing the different areas of exposure of the film frame.
Figure 12B:
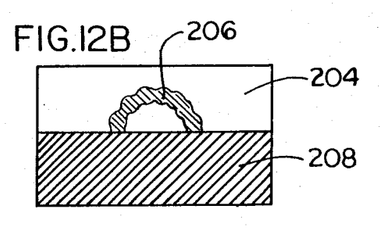
Figure 12C:
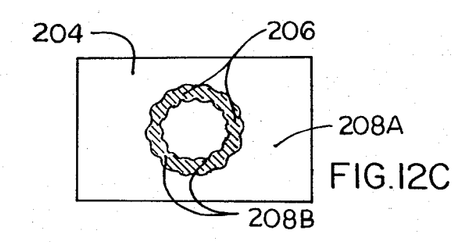

Exposing the film frame in the initial position will result in an exposure as illustrated in FIG. 12B. That is, there is one exposed area 204 and two unexposed areas 206 and 208. Areas 206 and 208 represent those areas that were covered by the circular masks 202 and mask member 200 respectively.

Figure 12D:
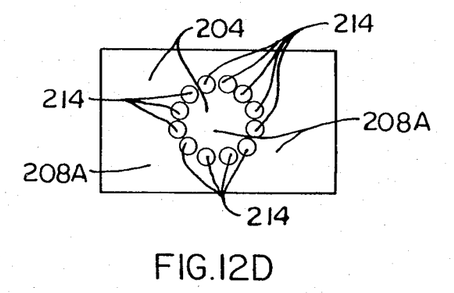
Figure 12E:
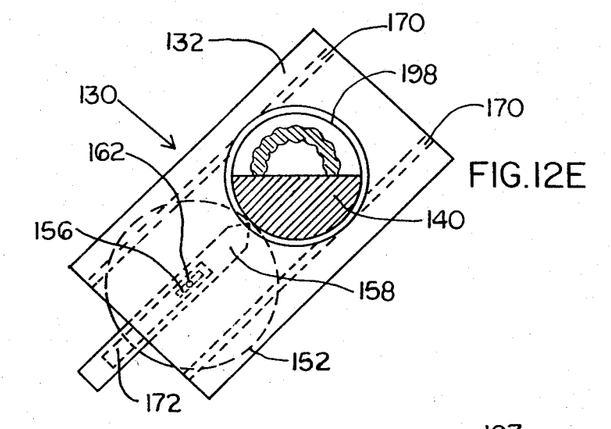

After repositioning the film frame for another exposure the mask 130 is then rotated by rotating the housing 54 or the disc member 136 to cover the areas 204 and 206. The film frame is then exposed, resulting in the area 208a being exposed and area 208B being unexposed. The unexposed areas 206 and 208B will give the desired vignetting effect. A mask 210 having an opening 212 formed therein is provided to slide in the tracks 170. The opening 212 is of the same demensions as one of the circular mask 202. When the mask 210 is aligned in the tracks 170 the disc member 136 can then be rotated so that light is directed to each one of the areas 206 and 208B thereby providing exposed areas 214 (FIG. 12D). As a result a film frame having 16 different scenes with the desired vignetting effect is provided as illustrated.

Figure 13A:
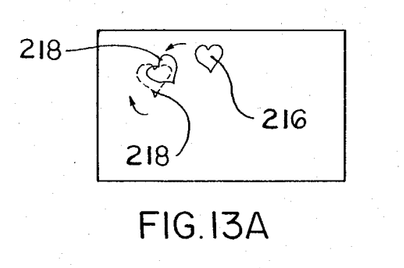
FIGS. 13A–13C are views of the third embodiment of the mask illustrating another multiple imaging attachment and showing the different areas of exposure of the film frame.
Figure 13B:
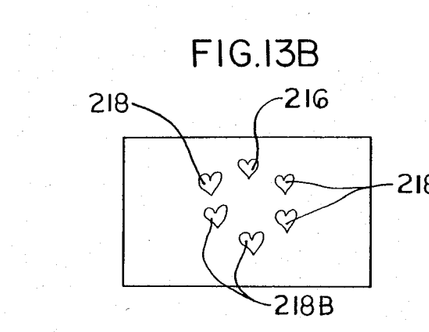
Figure 13C:
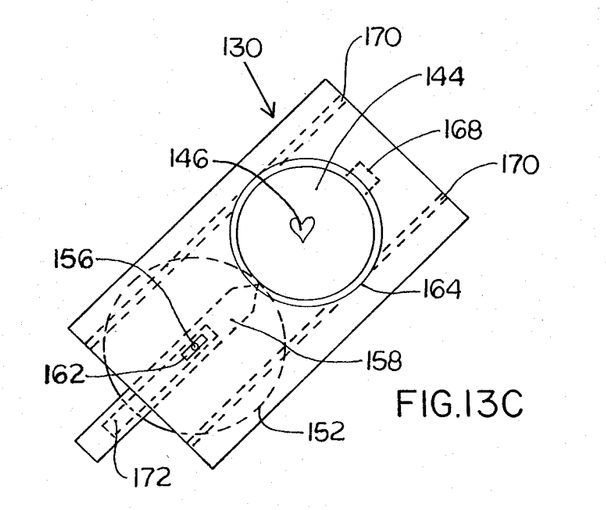

FIG. 13 illustrates another feature of the third mask embodiment 130. The mask 130 here includes the mask member 144 illustrated in FIG. 9. In this embodiment the mask 130 slides diagonally in housing 54 to expose an area, such as, for example, area 216 (FIG. 13A). The housing 54 can then be rotated to place the opening 146 on another desired diagonal path as is illustrated by the area 218. Because of the rotation of the housing 54 the opening 146 is not positioned as desired. Accordingly the independent rotating feature of the disc member 132 can be employed. This is done by rotating the rotating member 152 or pivoting the elongated member 158 so the opening 146 is rotated until it is in the desired position as is illustrated by the dotted area 218. This results in the heart being upright and areas 216 and 218 having the same characteristic. This process of moving the mask 130 and disc 132 can be continued until the desired multiple imaging and vignetting effect is achieved such as is illustrated in FIG. 13B.

It should be understood that the selection of the masking members illustrating the multiple imaging and vignetting effects shown in FIGS. 8–13 are examples only and that numerous other masking member may be employed in accordance with this invention without departing from the spirit and scope of the invention.

It is to be further understood that other arrangements may be described by those skilled in the art without departing from the spirit and scope of the invention.

What is claimed is:

1. A multiple imaging attachment to be utilized with a camera to selectively expose a film frame including:
   a housing having an opening formed therethrough for allowing light to be transmitted longitudinally therethrough to expose the film frame;
   means, having an opening formed therein, for masking the opening in the housing and for transmitting light to first selected portions of the film frame to allow exposure of said first selected portions;
   means for moving the masking and light transmitting means along a predetermined diagonal path across the film frame so that light can be transmitted to allow exposure of second selected portions of the film frame; and
   means for rotating the masking and light transmitting means so that light can be transmitted to allow exposure of third selected portions of the film frame.

2. A multiple imaging attachment as defined in claim 1 further including a means for aligning the opening of the masking and light transmitting means so that, after rotation, the exposed third selected portions of the film frame are aligned identically to the exposed second selected portions of the film frame.

3. A multiple imaging attachment as defined in claim 2 wherein the masking and light transmitting means includes:
- a rectangular support member having an opening formed therein;
- a support ring having an opening formed therein rotatably mounted in the opening in the rectangular support; and
- a masking member supported in the opening in the support ring, the masking member including a first section which is an opening formed therein for transmitting light to expose portions of the film frame and a second section which masks other portions of the film frame.

4. A multiple imaging attachment as defined in claim 3 wherein the means for moving the masking and light transmitting means along a predetermined diagonal path includes:
- a pair of spaced abutments formed in the housing and aligned to extend along the outer periphery of the lens; and
- a pair of spaced tracks on the masking and light transmitting means, the spaced tracks on the masking and light transmitting means being aligned to engage and cooperate with the spaced abutments in the housing to secure the masking and light transmitting means for slidable movement in the housing between the spaced abutments.

5. A multiple imaging attachment as defined in claim 4 wherein the means for rotating the masking and light transmitting means includes:
- a first track formed in portions of a first section of the housing;
- a first pair of locking members held in the first track in alignment with and adjacent to selected portion of the camera so that the first section of the housing can be rotated thereon;
- a second track formed in another portion of the first section of the housing;
- a second pair of locking members held in the second track in alignment with and adjacent to a second section of the housing so that the second section of the housing is locked to the first section of the housing.

6. The multiple imaging attachment as defined in claim 5 wherein the means for moving the masking and light transmitting means along a predetermined path further includes:
- a gearing track formed on a portion of the masking and light transmitting means; and
- means mounted in the housing adjacent to the gearing track for cooperating with the gearing track to move the masking and light transmitting means in the housing between the spaced abutments.

7. A multiple imaging attachment as defined in claim 6 wherein the means for aligning the masking and light transmitting means include:
- a means, aligned so as to engage the support rings, for rotating the support ring a predetermined distance upon application of a force to the support ring rotating means.

8. A multiple imaging attachment as defined in claim 7:
- wherein the support ring of the masking and light transmitting means includes a plurality of teeth formed about the periphery thereof; and
- wherein the means for aligning the masking and light transmitting means includes a disc having a plurality of teeth formed about the periphery thereof, the disc being aligned adjacent to the support ring so that the teeth of the disc will engage the teeth of the support ring and thereby rotate the support ring upon application of a manual force to the disc.

9. A multiple imaging attachment as defined in claim 7:
- wherein the support ring of the masking and light transmitting means includes a plurality of teeth formed about the periphery thereof; and
- wherein the means for aligning the masking and light transmitting means includes an elongated member having a beveled end, the elongated member being aligned adjacent to the support ring so that the beveled end of the elongated member will engage the teeth of the support ring and thereby rotate the support ring upon application of a manual force to the elongated member.

10. A multiple imaging attachment to be utilized with a camera to selectively expose a film frame including:
- a housing having an opening formed therethrough for allowing light to be transmitted longitudinally therethrough to expose the film frame;
- first masking means for masking first selected portions of the film frame and exposing second selected portions of the film frame;
- second masking means for masking third selected portions of the film frame, said third selected portions being the intersection of the second masking means and the second selected portions of the film frame;
- means for rotating the first and second masking means so that the second and third selected portions of the film frame are masked, some of the first selected portions are exposed and fourth selected portions are masked; said fourth selected portions being the intersection of the second masking means and the first selected portions of the film frame; and
- means for exposing the third and fourth selected portions of the film frame.

11. A multiple imaging attachment as defined in claim 10 wherein the means for rotating the first and second masking means includes:
- a first track formed in portions of a first section of the housing;
- a first pair of locking members held in the first track in alignment with and adjacent to selected portions of the camera so that the first section of the housing can be rotated thereon;
- a second track formed in another portion of the first section of the housing;
- a second pair of locking members held in the second track in alignment with and adjacent to a second section of the housing so that the second section of the housing is locked to the first section of the housing.

12. A multiple imaging attachment as defined in claim 11 wherein the first masking means includes:
- a rectangular support member having an opening formed therein; and
- a masking member supported in the opening for masking portions of the film frame; and wherein the second masking means is coupled to the masking member of the first masking means.

13. A multiple imaging attachment as defined in claim 11 wherein the first means includes:
 a rectangular support member having an opening formed therein;
 a pair of spaced tracks; and
 a masking member supported in the spaced tracks adjacent to the opening in the support member, for masking portions of the film frame; and wherein the second masking means is coupled to the masking member of the first masking means.

* * * * *